United States Patent
Perdicaro

(10) Patent No.: US 10,397,448 B2
(45) Date of Patent: Aug. 27, 2019

(54) INTRODUCING VISUAL NOISE IN A FLAT TINT AREA OF A PRINTED IMAGE

(71) Applicant: Hewlett-Packard Development Company, L.P., Houston, TX (US)

(72) Inventor: Frank Evan Perdicaro, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/096,758

(22) PCT Filed: Jun. 24, 2016

(86) PCT No.: PCT/US2016/039413
§ 371 (c)(1),
(2) Date: Oct. 26, 2018

(87) PCT Pub. No.: WO2017/222564
PCT Pub. Date: Dec. 28, 2017

(65) Prior Publication Data
US 2019/0124234 A1 Apr. 25, 2019

(51) Int. Cl.
| | |
|---|---|
| *G06K 15/10* | (2006.01) |
| *H04N 1/62* | (2006.01) |
| *H04N 1/52* | (2006.01) |
| *G06K 15/02* | (2006.01) |
| *H04N 1/405* | (2006.01) |

(52) U.S. Cl.
CPC ............ *H04N 1/62* (2013.01); *G06K 15/102* (2013.01); *G06K 15/1874* (2013.01); *G06K 15/1881* (2013.01); *H04N 1/4051* (2013.01); *H04N 1/52* (2013.01)

(58) Field of Classification Search
CPC combination set(s) only.
See application file for complete search history.

(56) References Cited

U.S. PATENT DOCUMENTS

| | | | |
|---|---|---|---|
| 6,278,802 | B1 | 8/2001 | Delabastita et al. |
| 8,824,014 | B1 | 9/2014 | Robinson et al. |
| 8,941,884 | B1 | 1/2015 | Keithley |
| 2003/0001910 | A1 | 1/2003 | Giere et al. |
| 2009/0060367 | A1 | 3/2009 | Wei |
| 2013/0155422 | A1 | 6/2013 | Kuo et al. |

OTHER PUBLICATIONS

AGFA White Paper. XM (Cross Modulated) Screening Technology. Aug. 22, 2008.

*Primary Examiner* — Barbara D Reinier
(74) *Attorney, Agent, or Firm* — HP Inc. Patent Department

(57) ABSTRACT

In an example, an apparatus is described that includes a color conversion module an a visual noise module. The color conversion module converts page description language describing an image into rasterized image data. The visual noise module then recalculates pixel values in an area of flat tint detected in the rasterized image data to introduce visual noise in the area of flat tint.

15 Claims, 7 Drawing Sheets

INTRODUCING VISUAL NOISE IN A FLAT TINT AREA OF A PRINTED IMAGE

BACKGROUND

Digital printing technologies rely on the adhesion of printing fluid particles to a substrate (e.g., paper, plastic, or other materials) to produce a printed image, such as a recreation of a digital image. The location of the printing fluid particles on the substrate is electrically controlled to produce a desired image. The printed image may include areas of flat tint (i.e., exhibiting one uniform shade) and areas of non-flat tint (i.e., exhibiting a range of tones or shades).

DETAILED DESCRIPTION

The present disclosure broadly describes an apparatus, method, and non-transitory computer-readable medium for selectively introducing visual noise in a flat tint area of a printed image. As discussed above, a printed image may include areas of flat tint (i.e., exhibiting one uniform shade) and areas of non-flat tint (i.e., exhibiting a range of tones or shades). Smooth flat tints are difficult to produce using certain popular digital printing technologies, such as inkjet printing technologies; visual discontinuities in the printed images are common and unappealing to the human eye.

Examples of the present disclosure add visual noise in flat tint areas of a printed image, in order to make it more difficult for the human eye to spot the visual discontinuities introduced by the printing technology. In one example, the visual noise is added in the compression domain, after rasterization but before printing. In some examples, inherent or added features of compressed file formats that provide random access of regular areas and tessellation (e.g., Indigo Compressed Format (ICF), tiled tagged image file format (TIFF), and portable network graphics (PNG)) may be exploited to facilitate easy detection and separation of flat tint areas. In further examples, non-tessellating file formats with raster, where the raster can be classified, can also be exploited, as can streaming file formats with synchronization points (e.g., pigz multi-threaded file compression tool). Once the flat tint areas have been altered with visual noise, the altered data is recompressed. The altered data may be recompressed without recompressing the unaltered data, in order to conserve time and processing resources.

Figure 1:
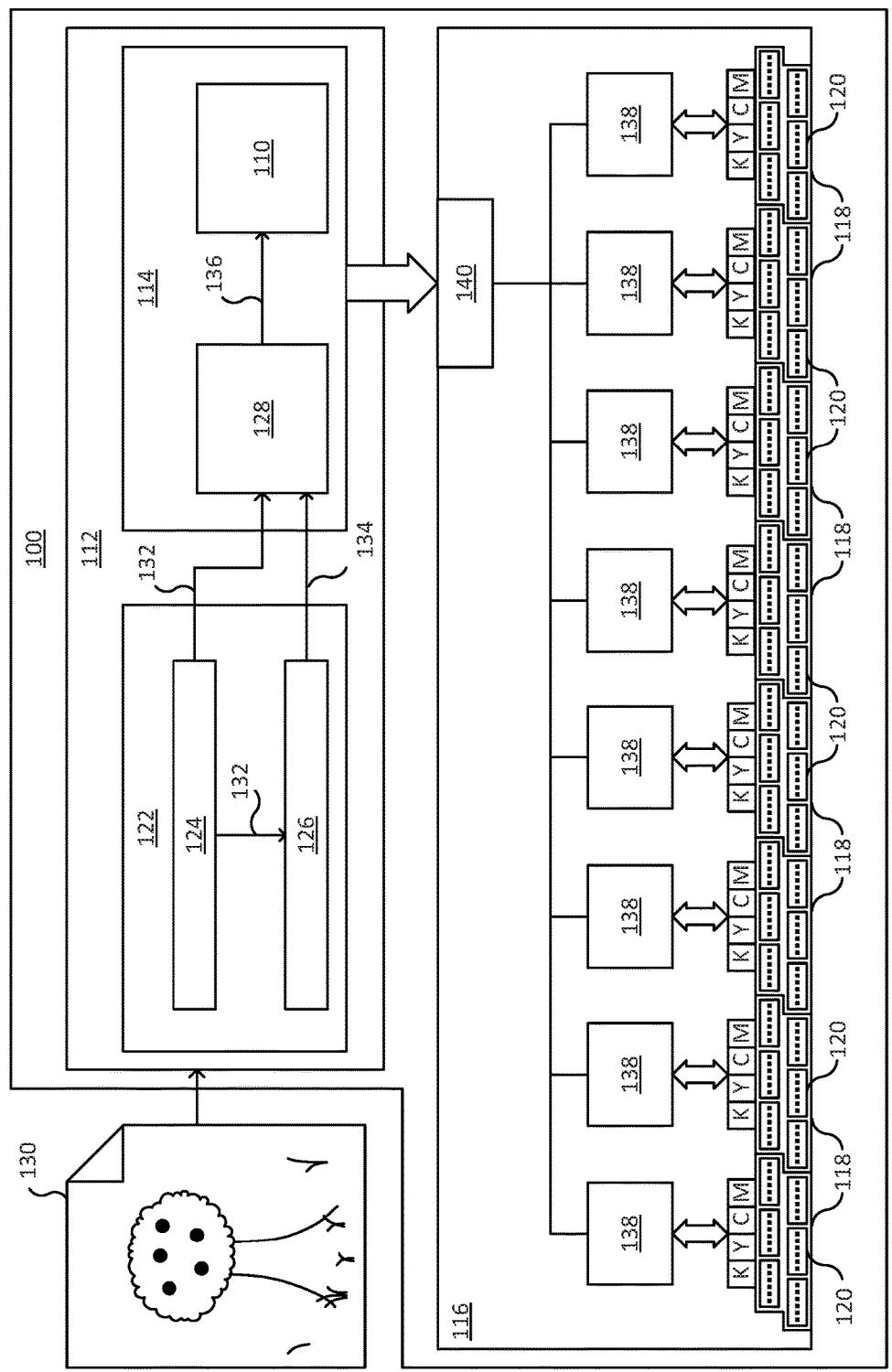
FIG. 1 is a block diagram of an example system of the present disclosure.

FIG. 1 illustrates an example system 100 of the present disclosure. In one example, the system 100 is a printer, such as an inkjet printer. The system 100 generally includes an image processing system 112 and a print engine 116. The image processing system 112 and print engine 116 work together to convert original image data 130 (e.g., a digital image) into a printed image on a substrate.

In one example, the image processing system 112 further comprises a raster image processor (RIP) 122 and a print engine controller 114. The RIP 122 converts the page description language (PDL) describing the original image data 130 to rasterized (e.g., inkjet) image data 132. To this end, the RIP 122 includes a color conversion module 124 and a visual noise module 126. The color conversion module 124 performs color conversion on the original image data 130 and may additionally map the colors to generate continuous tone (or "contone") rasterized image data 132. The color conversion module 124 may use one or more page description languages to process the original image data 130.

The visual noise module 126 identifies areas of flat tint in the contone rasterized image data 132 and adds visual noise to the identified areas of the contone rasterized image data 132. To this end, the visual noise module 126 may comprise an ICF05 library that compresses the contone rasterized image data 132 into a plurality of tiles to facilitate detection of flat tint areas, as discussed in further detail in connection with FIG. 7. However, ICF05 is only one type of file format that may be used in the compression domain. Modified raster image data 134 (including selectively introduced visual noise) may be created from at least partially recompressed data (e.g., at least the modified data may be recompressed). Thus, depending on whether the original image data 130 included areas of flat tint that were modified to include visual noise, either the rasterized image data 132 or the modified raster image data 134 is passed to the print engine controller 114. That is, if there are no flat tint areas in the original image data 130 (or no flat tint areas of at least a predefined minimum size), then the rasterized image data 132 may be passed to the print engine controller 114 instead of the modified raster image data 134.

Either or both of the color conversion module 124 and the visual noise module 126 may be implemented as a distinct programming element or as part of an integrated program or programming element to perform specified functions. Furthermore, either or both of the color conversion module 124 and the visual noise module 126 may include a processor and/or other electronic circuitry and components to execute the programming (i.e., executable instructions) to perform the specified functions. In some examples, modules, such as modules 124 and 126 of FIG. 1, may comprise a combination of hardware and programming to implement the functionalities of the modules.

The print engine controller 114 includes a halftoning module 128 and a colors-to-printing-fluid conversion module 110. In another example, the halftoning module 128 may reside on the RIP 122. The halftoning module 128 receives either the contone rasterized image data 132 or the modified raster image data 134 (which may comprise eight bits of data per pixel in each color plane) and converts it to halftone data 136. Conversion to halftone data 136 includes approximating continuous tone colors with a limited number of available discrete colors. For instance, the colors that the system 100 cannot print directly may be simulated using patterns of pixels in the colors that are available, which may include cyan, magenta, yellow, and black (CMYK) color ink when the system 100 is a color inkjet printer. The halftoning module 128 may perform any one or more halftoning techniques to perform this conversion. Moreover, the halftoning module 128 may include a library of pre-existing halftone patterns to facilitate the conversion. The library of pre-existing halftone patterns may also be accessible by the visual noise module 126, which may use one or more pre-existing halftone patterns in order to introduce visual noise into rasterized image data 132.

The colors-to-printing-fluid conversion module 110 receives the halftone data 136 and maps the halftone data 136 to drops of printing fluid to be generated by the printheads 120. This information may be used to drive the printheads 120 to produce a printed image.

Either or both of the halftoning module 128 and the colors-to-printing-fluid conversion module 110 may be implemented as a distinct programming element or as part of an integrated program or programming element to perform specified functions. Furthermore, either or both of the halftoning module 128 and the colors-to-printing-fluid conversion module 110 may include a processor and/or other electronic circuitry and components to execute the programming (i.e., executable instructions) to perform the specified functions.

Moreover, although the print engine controller 114 is illustrated as an internal component of the system 100, some printer controller functions may be performed outside of the system 100. Thus, the system illustrated in FIG. 1 shows only one example configuration that may be used to implement the functionality of the color conversion module 124, the visual noise module 126, and the halftoning module 128.

In one example, the print engine 116 is implemented as a modular print bar that includes a plurality of printhead modules 118, each of which is controlled by a respective print module controller 138. Each printhead module, in turn, includes a plurality of printheads 120. The printheads 120 may be of the type used in high-speed commercial inkjet printing presses. The printheads 120 are driven by the halftone data 136 produced by the halftoning module 128, for instance at one or two bits of data per pixel in each color plane. In this example, the print engine controller 114 passes instructions to the print engine 116 via a print bar interface 140.

Figure 2:
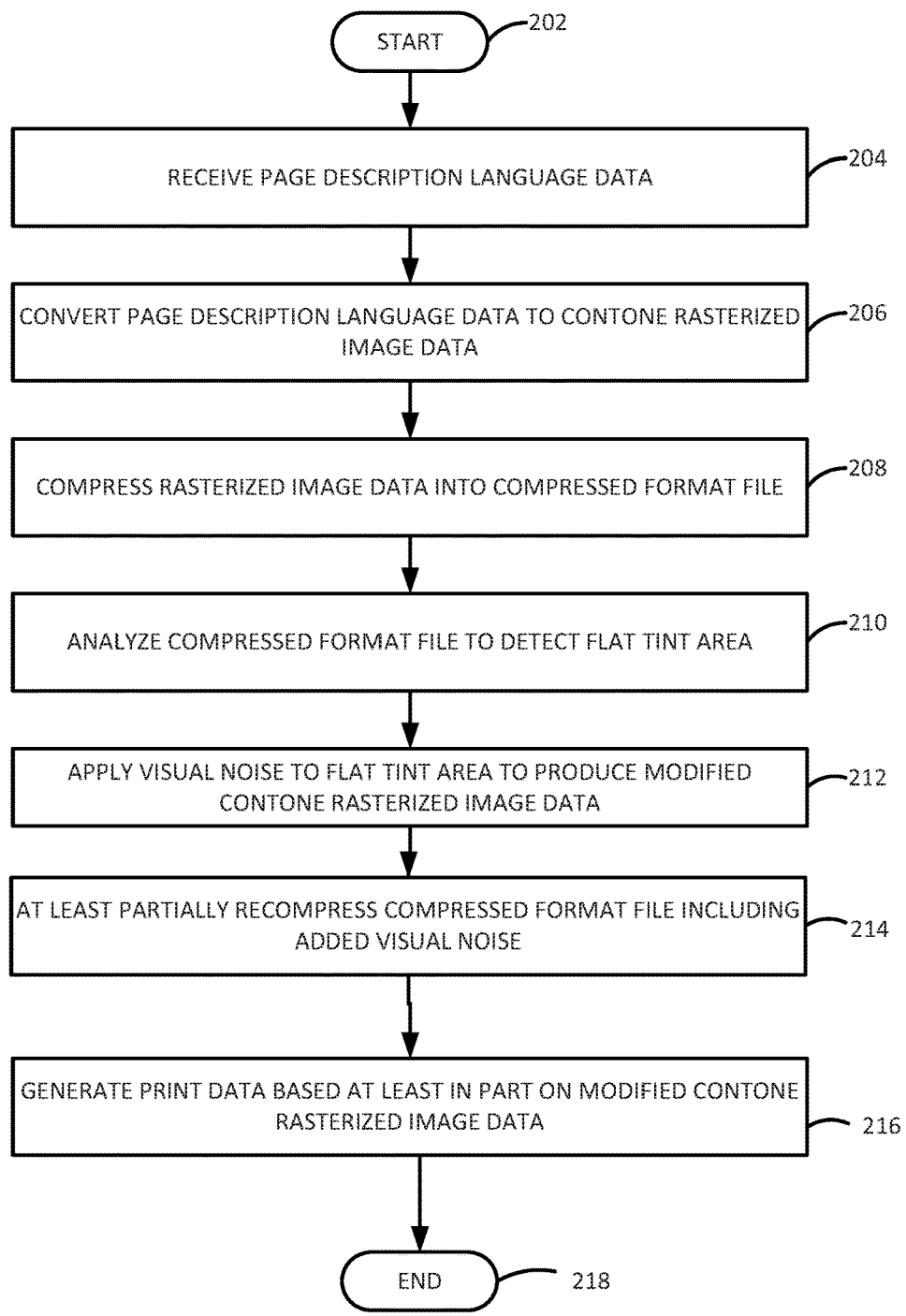
FIG. 2 illustrates a flowchart of an example method for selectively introducing visual noise in a flat tint area of a printed image.

FIG. 2 illustrates a flowchart of an example method 200 for selectively introducing visual noise in a flat tint area of a printed image. The method 200 may be performed, for example, by the system 100 illustrated in FIG. 1. As such, reference is made in the discussion of FIG. 2 to various components of the system 100 to facilitate understanding. However, the method 200 is not limited to implementation with the system illustrated in FIG. 1.

The method 200 begins in block 202. In block 204, the system 100 receives page description language (PDL) data corresponding to original image data, such as original image data 130. The original image data comprises an image to be printed, such as a digital image.

In block 206, the color conversion module 124 converts the PDL data to contone rasterized image data 132. As discussed above, rasterization of the PDL data may include color conversion and mapping of the original image data to contone rasterized image data 132.

In block 208, the visual noise module 126 compresses the rasterized image data 132 into a compressed file format. One example of a compressed file format that the visual noise module may work with is the Indigo Compressed Format (ICF), e.g., ICF05, which is a lossy tiled form of image representation. However, other compressed file formats that provide random access of regular areas and tessellation may also be used.

Figure 3:
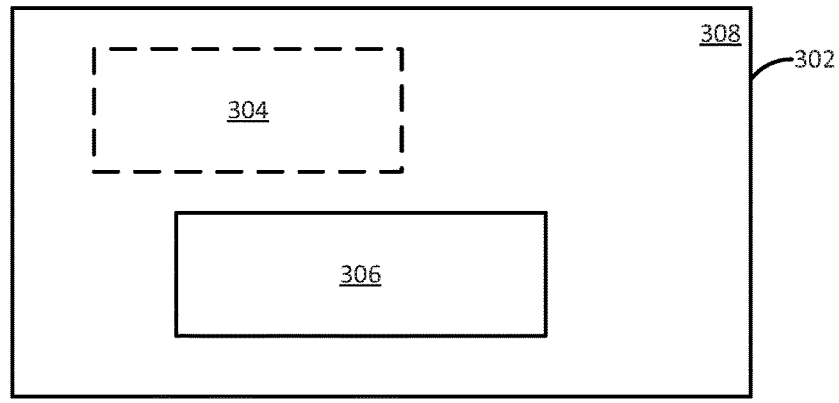
FIG. 3 illustrates a layout of an example Indigo Compressed Format file that may be generated from page description language data.

FIG. 3, for instance, illustrates a layout of an example Indigo Compressed Format file 300 that may be generated from the PDL data. Within the ICF page boundary 302 are a number of distinct ICF areas or "tiles", including a high-contrast ICF area 304, a flat tint ICF area 306, and a blank ICF area 308. In one example, each tile comprises four pixels on edge. The high-contrast ICF area 304 has high-frequency sharp internal edges and small spans, such as may be typical in areas of text. The flat tint ICF area 306 is typically associated with relatively long run length codes in the ICF specifications, such as run length codes 0xE0 through 0xE3 and 0FC. The blank ICF area 308 represents a blank or transparent area of the page in which no printing fluid is put down. Both the flat tint ICF area 306 and the blank ICF area 308 are considered contone areas.

Figure 4:
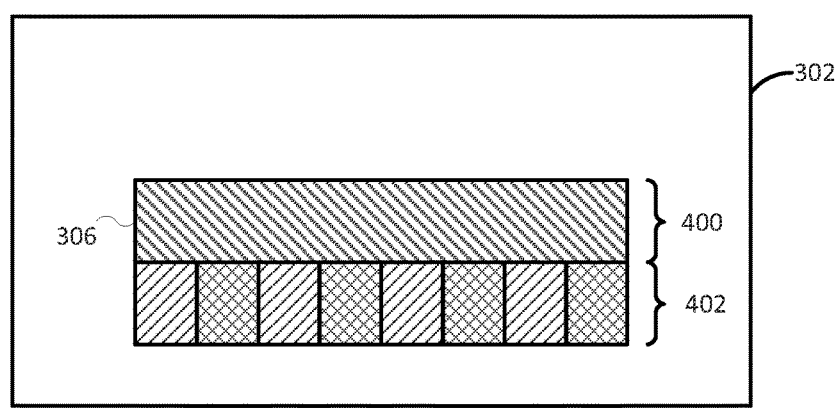
FIG. 4 illustrates the flat tint Indigo Compressed Format area of the Indigo Compressed Format file of FIG. 3, with exaggerated color defects.

FIG. 4 illustrates the flat tint Indigo Compressed Format area 306 of the Indigo Compressed Format file 300 of FIG. 3, with exaggerated color defects. As illustrated, the flat tint area 306 may be generated by multiple pen areas 400 and 402. The first pen area 400 and the second pend area 402 demonstrate that one pen of a printing system may not have exactly the same color response as its adjacent pen. As a result, in an area of flat tint such as the flat tint ICF area 306, a visible line may appear between areas generated by two different pens due to the color break. Moreover, the second pen area 402 demonstrates that even one pen may not be capable of providing consistent color as the substrate moves. Certain tints may be more problematic due to interactions with halftoning.

Referring back to FIG. 2, in block 210, the visual noise module 126 analyzes the compressed format file to detect a flat tint area. One example of a method for detecting a flat tint area in a compressed format file is discussed in greater detail in conjunction with FIG. 7. In one example, a threshold is applied to ensure that the flat tint area that is detected is at least as large as a minimum size (e.g., a size large enough to show visible defects, such as one square inch).

In block 212, the visual noise module 126 applies visual noise to the flat tint area detected in block 210. In one example, visual noise is applied to the flat tint area by random variation of the pixels in the area and recalculating of the pixel values. One technique for achieving random variation of pixels is known as "dithering." Dithering involves adding noise to a signal to generate a desired result, which, in this case, is to obscure an undesirable effect (e.g., visual discontinuity) created by other parts of the printing system 100. In one example, dithering of pixels in two dimensions may involve varying one or more of: (1) the size of the area to be changed; (2) the magnitude of the variance; and (3) the repeat pattern. However, dithering does not have an overall influence on the color of the area, and thus remains power neutral (e.g., the average color of the flat tint area does not change). Thus, as a simple example, dithering might involve use of a two-pixel pattern, where one pixel has a unit saturation that is one unit higher than the area to be dithered, and the other pixel has a unit saturation that is one unit lower than the area to be dithered. The repeat pattern in this case would comprise one pixel in one dimension, and two pixels in the other dimension.

Figure 5:
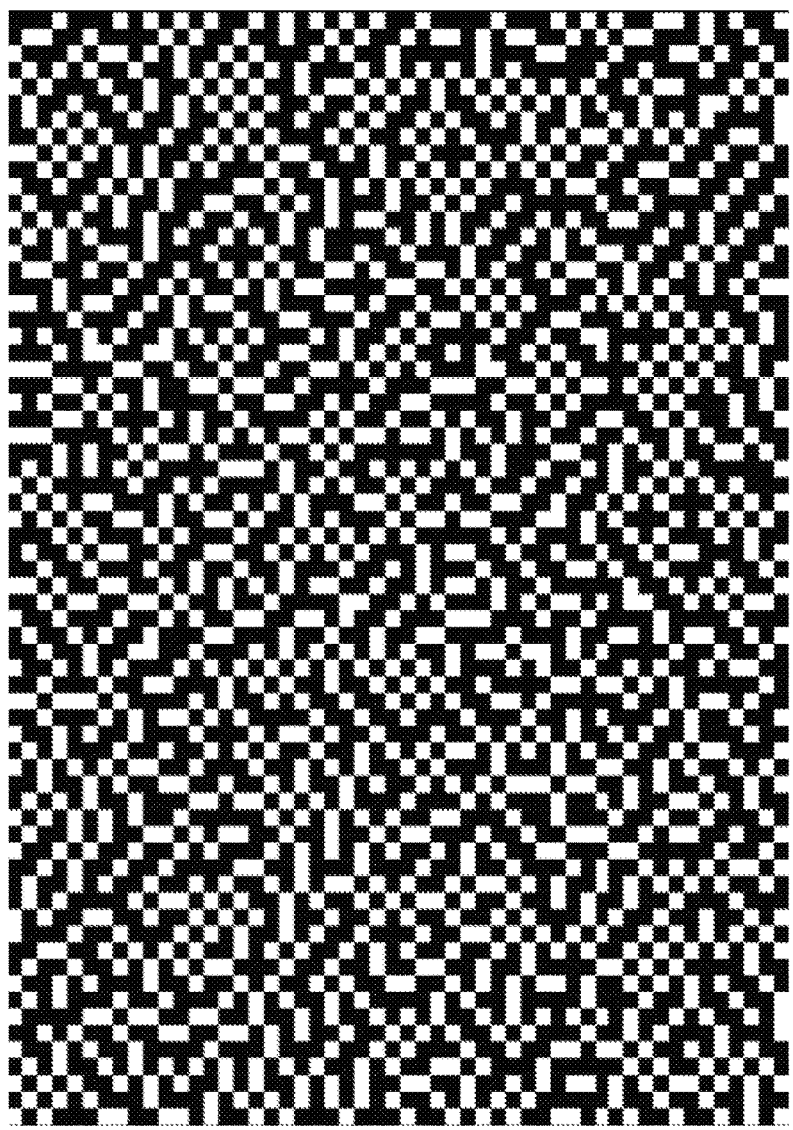
FIG. 5 depicts an example Harlequin Dispersed Screening Super Fine binary frequency modulation halftone pattern that may be used to apply noise to the flat tint area of the initial contone rasterized image data.

Various constraints are balanced in order to produce an effect that is small enough to avoid detection by the human eye and large enough pass through the halftoning process performed by the halftoning module 128. If the effect is too small, it will be diminished in the halftoning process; however, if the effect is too large, it will be visible to the human eye and therefore defeat its purpose. In one example, the "guide plate" method disclosed in Patent Cooperation Treaty Application No. PCT/US2015/042232, filed 27 Jul. 2015, is used to add visual noise in a manner that varies the transparency of a pre-existing halftone pattern (rather than progressing from opaque to transparent as disclosed). The pre-existing halftone pattern may be retrieved from the visual noise module 126 from a library and may comprise a frequency modulation (FM) pattern, a cross modulated (XM) pattern, a delta modulation (DM) pattern, an error diffusion screening (EDS) pattern, or other non-amplitude modulation (AM) pattern. FIG. 5, for instance, depicts an example Harlequin Dispersed Screening Super Fine binary FM halftone pattern that may be used to create a pattern that can apply noise to the flat tint area the compressed format file. One example of a method for dithering using the "guide plate" method is discussed in greater detail in conjunction with FIG. 8.

Figure 6:
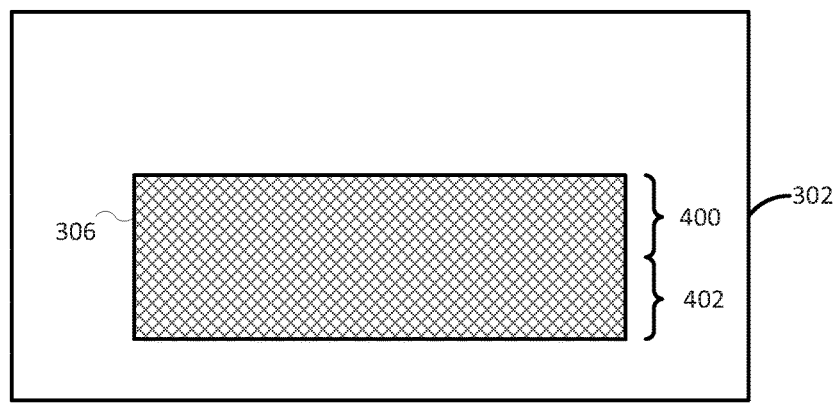
FIG. 6 illustrates the Indigo Compressed Format file of FIGS. 3 and 4, with the flat tint Indigo Compressed Format area enhanced by visual noise via a modified version of the halftone pattern depicted in FIG. 5.

FIG. 6 illustrates the Indigo Compressed Format file 300 of FIGS. 3 and 4, with the flat tint Indigo Compressed Format area 306 enhanced by visual noise via a modified version of the halftone pattern depicted in FIG. 5. As illustrated, the visual discontinuities introduced in the first pen area 400 and second pen area 402 of the flat tint ICF area 306 are less visible.

Referring back to FIG. 2, in block 214, the compressed format file is at least partially recompressed by the visual noise module 126. In one example, the altered data (e.g., the altered tiles) of the compressed format file is recompressed (e.g., the pixel values are recalculated). The altered data may be recompressed without recompressing the unaltered data of the compressed format file (e.g., without recalculating the values of unaltered pixels or pixels of non-flat tint areas), in order to conserve time and processing resources. Even partial recompression of the compressed format file may increase the size of the compressed format file, so a new compressed format file or memory image may be created as a result of the recompression (rather than performing an overwrite of the original compressed format file).

Compressed format files such as ICF files can be recompressed from the unraveled state using a simple tool to build run lengths from the modified scanlines. Once the run lengths corresponding to at least the altered scanlines have been recalculated, a scanline offset table can be recreated per the ICF specifications, and the ICF stream can be written, e.g., into the modified rasterized image data 134. Recompression of the compressed format file may not result in a change to the spatial aspects of the compression, but rather may alter the colors of the pixels and/or the byte count of the compressed format file.

In 216 the print engine controller 114 generates print data based at least in part on the modified contone rasterized image data 134, which has been generated from the modified compressed format file (i.e., including the alterations to the pixel colors and/or byte counts).

The method 200 ends in block 218. Subsequently, the resultant modified raster image data 134 can be passed to the print engine controller 114 as discussed above to facilitate printing of an image. The final printed image will include visual noise that has been selectively introduced into the flat tint areas according to the method 200.

Figure 7:
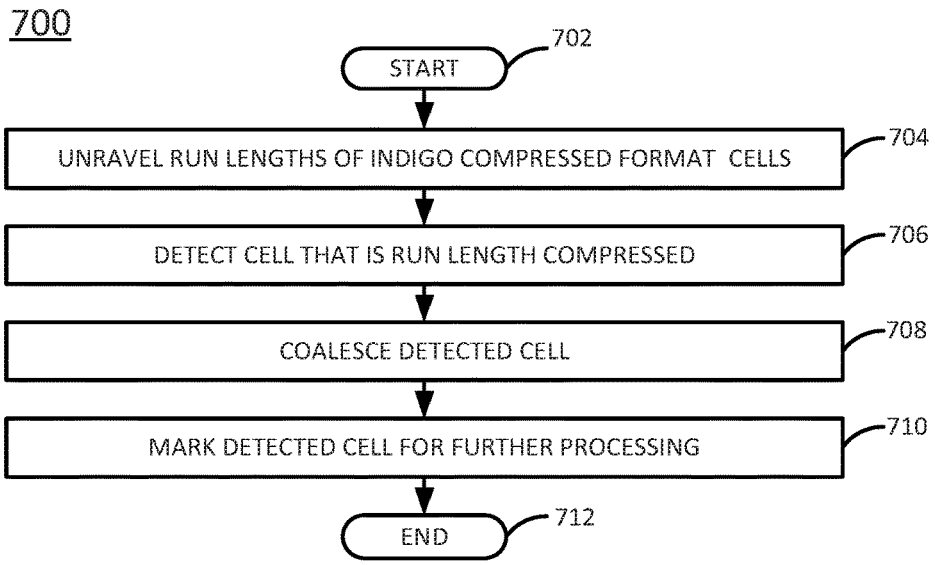
FIG. 7 illustrates a flowchart of an example method for detecting a flat tint area in an Indigo Compressed Format file.

FIG. 7 illustrates a flowchart of an example method 700 for detecting a flat tint area in an Indigo Compressed Format file. The method 700 may be performed, for example, by the visual noise module 126 illustrated in FIG. 1. As such, reference is made in the discussion of FIG. 7 to the visual noise module 126 to facilitate understanding. However, the method 700 is not limited to implementation with the system illustrated in FIG. 1. The method 700 takes advantage of the tiling and coalescence of flat tint areas inherent in the production of ICF05 files to identify areas of flat tint that may benefit from the introduction of visual noise. However, the method may also be used to detect flat tint areas in other types of compressed format files, such as file formats that file formats that provide random access of regular areas and tessellation.

The method 700 begins in block 702. In block 704, the visual noise module 126 unravels the run lengths of the ICF cells making up the ICF file. In one example, unraveling the run lengths involves expanding the compressed run lengths of each tile, e.g., so that each ICF tile represents sixteen pixels. In this case, the size of an unraveled ICF file will be one-quarter the size of the original raster (in pixels) in each dimension, and one-sixteenth the size of the original raster overall.

In block 706, the visual noise module 126 detects an ICF cell that is run length compressed (e.g., has a long run length). In one example, a cell having an ICF code of 0xE0 through 0xE3 and OFC is considered to be run length compressed. A long run length may indicate the presence of a large number of contone pixels, which in turn may indicate an area of flat tint. In one example, the RIP 122 may impose a minimum size constraint on these cells, such that the cells are ignored unless they are of at least a minimum size. In one example, the minimum size is a size that is large enough for any visual discontinuities to be visible to the human eye, e.g., one square inch. In further examples, the minimum size is configurable based on the printing fluids used, the target printing speed, or other technical factors that may influence the visibility of visual discontinuities.

In block 708, the visual noise module 126 coalesces the detected cell (which may be of at least the minimum size) in two dimensions. In one example, this is done by flood filling the area of flat tint. In one example, flood filling involves adding adjacent areas of the same color to the flat tint area. For example, the visual noise module 126 may convert a one-dimensional run into a two-dimensional rectangle by checking adjacent rows of the ICF file for the same color. This makes it easier to add the visual noise, for example using the method described in connection with FIG. 8.

In block 710, the visual noise module 126 marks the detected cell for further processing, which may include addition of visual noise. In one example, each uniquely colored flat tint area is marked independently, since different colors may benefit from different types of processing.

The method 700 ends in block 712.

Figure 8:
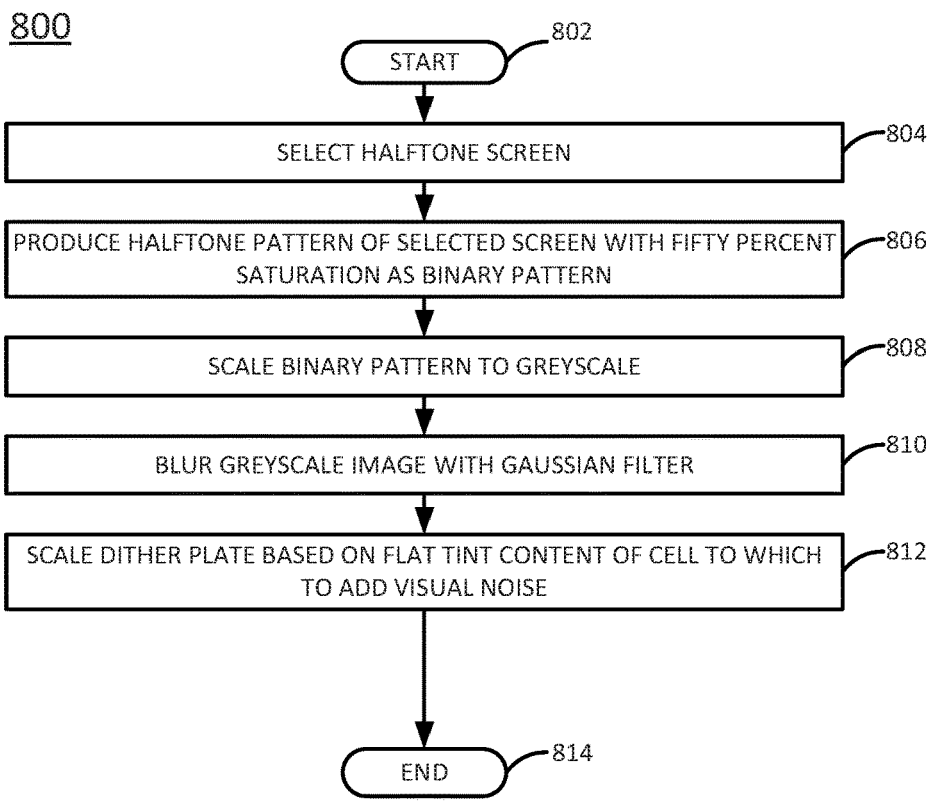
FIG. 8 illustrates a flowchart of an example method for method for dithering using a "guide plate.

FIG. 8 illustrates a flowchart of an example method 800 for method for dithering using a "guide plate". The method 800 is a variation on the technique disclosed in disclosed in Patent Cooperation Treaty Application No. PCT/US2015/042232. The method 800 may be performed, for example, by the visual noise module 126 illustrated in FIG. 1. As such, reference is made in the discussion of FIG. 8 to various components of the system 100 to facilitate understanding. However, the method 800 is not limited to implementation with the system illustrated in FIG. 1. In one example, dithering according to the method 800 is performed on the original (versus the unraveled) compressed format file, using the unraveled file to identify the areas to be modified.

The method 800 begins in block 802. In block 804, the visual noise module 126 selects a halftone screen. In one example, the halftone screen is a non-amplitude modulated (AM) screen. For instance, the Harlequin Dispersed Screening Super Fine binary FM halftone screen of FIG. 5 may be selected.

In block 806, the visual noise module 126 produces the halftone pattern of the selected screen at fifty percent saturation as a binary pattern.

In block 808, the visual noise module 126 scales the binary pattern to greyscale. In one example, the scaling may be accomplished by multiplying all pixels values in the binary pattern by a given number, such as 255.

In block 810, the visual noise module 126 blurs the greyscale image using a Gaussian filter. In one example, the radius of the Gaussian filter is approximately twice the length of the median span of the filter. This produces a dither plate with an appropriate spatial scale. However, the data magnitude scale of the dither plate may not be sufficient to satisfy customer demand or to achieve a perceived or desired level of quality in the printed image. In one example, the saturation may be varied at various values (starting, e.g., at five percent) above and below the flat tint value until an appropriate data magnitude scale can be achieved.

In block 812, the visual noise module 126 scales the dither plate to an appropriate scale based on the flat tint content of the cell to which the visual noise is to be added. In one example, this is accomplished by adding a dither value to at least some of the original pixel values in the cell of the original image. For instance, at least some of the pixels exhibiting a flat tint of forty percent cyan might be varied by plus or minus two percent (i.e., five percent of forty percent), for a range of four percent. In one example, every pixel in the cell may be dithered (i.e., its value modified within some range that maintains the same average pixel value over the cell). In another example, the average pixel value over the cell can be maintained by dithering some, but not all, of the pixel values.

At this point, the dither plate and the original image containing the cell are zero aligned. All resulting values will fall somewhere between zero and the number by which the pixel values were scaled in block, 808 (e.g., 255). Each modified compressed format contone cell will thus be replaced with another cell derived from the halftone pattern (spatially) and the magnitude of the dither (which may vary according to user guidance). Thus, the dithering technique of the method 800 is conceptually similar to halftoning, or to adding a high-voltage direct current signal to an alternating current signal to facilitate high-voltage, long-distance power transmission.

The method 800 ends in step 814.

It should be noted that although not explicitly specified, some of the blocks, functions, or operations of the methods 200, 700, and 800 described above may include storing, displaying and/or outputting for a particular application. In other words, any data, records, fields, and/or intermediate results discussed in the methods can be stored, displayed, and/or outputted to another device depending on the particular application. Furthermore, blocks, functions, or operations in FIGS. 2 and 7-8 that recite a determining operation, or involve a decision, do not necessarily imply that both branches of the determining operation are practiced. In other words, one of the branches of the determining operation can be deemed to be optional.

Figure 9:
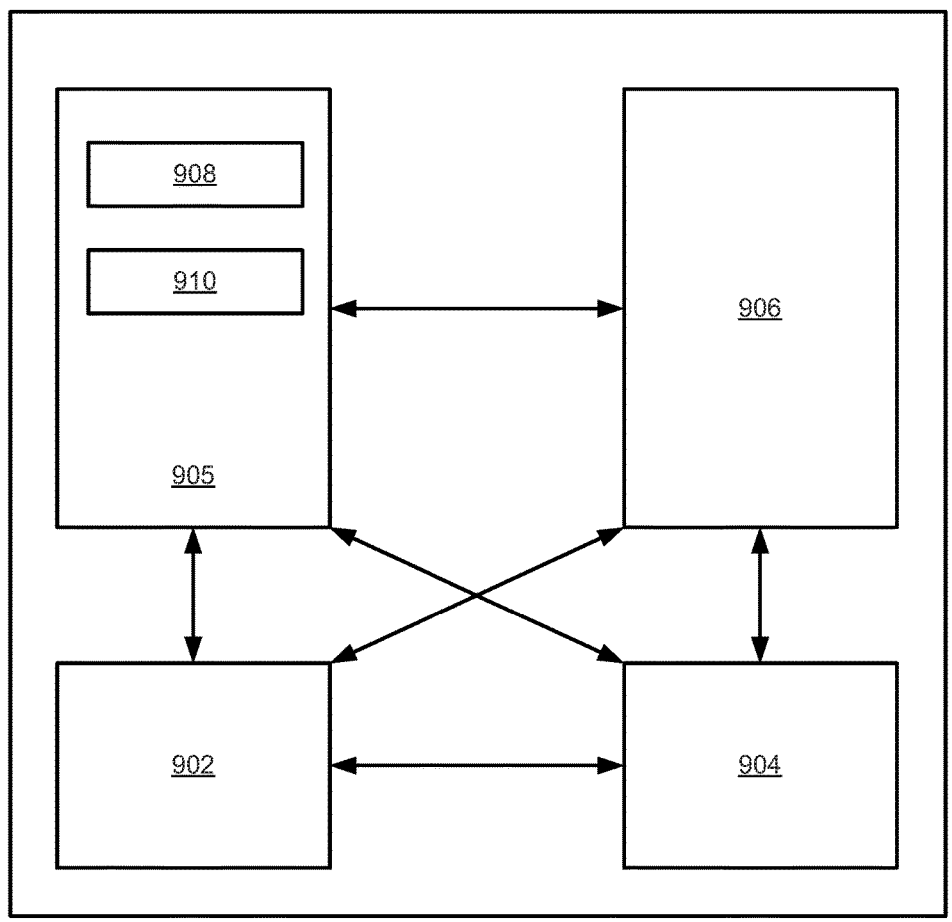
" and FIG. 9 depicts a high-level block diagram of an example computer that can be transformed into a machine capable of performing the functions described herein.

FIG. 9 depicts a high-level block diagram of an example computer that can be transformed into a machine capable of performing the functions described herein. Notably, no computer or machine currently exists that performs the functions as described herein. As a result, the examples of the present disclosure modify the operation and functioning of the general-purpose computer to selectively introduce visual noise in a flat tint area of a printed image, as disclosed herein.

As depicted in FIG. 9, the computer 900 comprises a hardware processor element 902, e.g., a central processing unit (CPU), a microprocessor, or a multi-core processor, a memory 904, e.g., random access memory (RAM) and/or read only memory (ROM), a module 905 for selectively introducing visual noise in a flat tint area of a printed image, and various input/output devices 906, e.g., storage devices, including but not limited to, a tape drive, a floppy drive, a hard disk drive or a compact disk drive, a receiver, a transmitter, a speaker, a display, a speech synthesizer, an output port, an input port and a user input device, such as a keyboard, a keypad, a mouse, a microphone, and the like. Although one processor element is shown, it should be noted that the general-purpose computer may employ a plurality of processor elements. Furthermore, although one general-purpose computer is shown in the figure, if the method(s) as discussed above is implemented in a distributed or parallel manner for a particular illustrative example, i.e., the blocks of the above method(s) or the entire method(s) are implemented across multiple or parallel general-purpose computers, then the general-purpose computer of this figure is intended to represent each of those multiple general-purpose computers. Furthermore, a hardware processor can be utilized in supporting a virtualized or shared computing environment. The virtualized computing environment may support a virtual machine representing computers, servers, or other computing devices. In such virtualized virtual machines, hardware components such as hardware processors and computer-readable storage devices may be virtualized or logically represented.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed methods.

In one example, instructions and data for the present module or process 905 for selectively introducing visual noise in a flat tint area of a printed image, e.g., machine readable instructions can be loaded into memory 904 and executed by hardware processor element 902 to implement the blocks, functions or operations as discussed above in connection with the methods 200, 700, and 800. For instance, the module 905 may include a plurality of programming code components, including a flat tint identifier component 908 and a dither function component 910. These programming code components may be included, for example, in a raster image processor, such as the RIP 122 of FIG. 1.

The flat tint identifier component 908 may be configured to identify areas of flat tint in an original image and to increase the sizes of the areas of flat tint, e.g., via a flood fill technique. For instance, the flat tint identifier component 908 may be configured to perform blocks of the method 700 described above.

The dither function component 910 may be configured to generate a guide plate that can be used to introduce visual noise into a flat tint areas of an original image. For instance, the dither function component 910 may be configured to perform blocks of the method 800 described above.

Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 605 for heating an intermediate transfer member of a printing apparatus in a spatially selective manner, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. An apparatus, comprising:
   a color conversion module for converting page description language describing an image into rasterized image data; and
   a visual noise module for recalculating pixel values in an area of flat tint detected in the rasterized image data to introduce visual noise in the area of flat tint.

2. The apparatus of claim 1, wherein the visual noise module comprises a library that compresses the rasterized image data into a compressed format file comprising a plurality of tiles.

3. The apparatus of claim 1, further comprising:
   a library of halftone patterns accessible by the visual noise module, wherein the visual noise module uses a halftone pattern from the library to guide the recalculating of the pixel values.

4. The apparatus of claim 1, further comprising:
   a halftoning module for converting the rasterized image data, including the visual noise, into halftone data.

5. The apparatus of claim 1, further comprising:
   a print engine controller for generating print data based at least in part on the pixel values, as recalculated; and
   a print engine for printing an image on a substrate based on the print data.

6. The apparatus of claim 5, wherein the apparatus is an inkjet printer.

7. A non-transitory machine-readable storage medium encoded with instructions executable by a processor, the machine-readable storage medium comprising:
   instructions to convert page description language describing an image into rasterized image data;
   instructions to analyze the rasterized image data to detect an area exhibiting a flat tint;
   instructions to generate modified rasterized image data by recalculating pixel values in the area of flat tint to introduce visual noise in the area of flat tint.

8. The non-transitory machine-readable storage medium of claim 7, wherein the rasterized image data comprises a compressed format file.

9. The non-transitory machine-readable storage medium of claim 8, wherein the instructions to analyze comprise:
   instructions to unravel the compressed format file into a plurality of cells; and
   instructions to detect a cell of the plurality of cells that is run length compressed, wherein the cell contains the flat tint area.

10. The non-transitory machine-readable storage medium of claim 7, wherein the instructions to generate comprise:
    instructions to apply a random variation to the pixel values without changing an average color of the flat tint area.

11. The non-transitory machine-readable storage medium of claim 10, wherein the random variation is achieved using a dithering technique.

12. The non-transitory machine-readable storage medium of claim 11, wherein the dithering technique is performed by varying a transparency of a non-amplitude modulated halftone pattern that is applied to the flat tint area.

13. The non-transitory machine-readable storage medium of claim 7, wherein the pixel values in the area of flat tint are recalculated without recalculating pixel values in areas of non-flat tint in the initial rasterized image data.

14. A method, comprising:
    converting page description language describing an image into rasterized image data;
    analyzing the rasterized image data to detect an area exhibiting a flat tint; and
    generating modified rasterized image data by recalculating pixel values in the area of flat tint to introduce visual noise in the area of flat tint.

15. The method of claim 14, further comprising:
    generating print data based at least in part on the modified rasterized image data.

* * * * *